Figure 1:
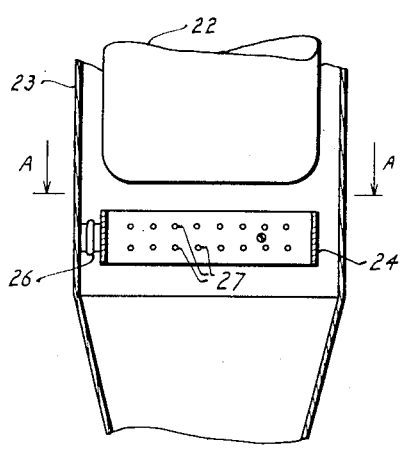

Feb. 13, 1934.   F. HALLOPEAU ET AL   1,947,412
CONTROL GRID STRUCTURE FOR RECTIFIERS
Filed April 26, 1930   2 Sheets-Sheet 1

Inventors
François Hallopeau
Willi Boveri
Arthur Gaudenzi
By Alfred H. Dyson
Attorney

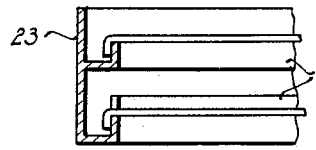
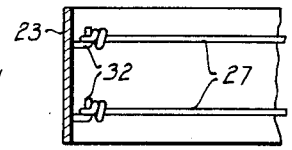
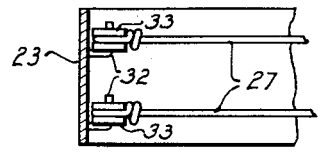
Fig. 7.  Fig. 9.  Fig. 11.
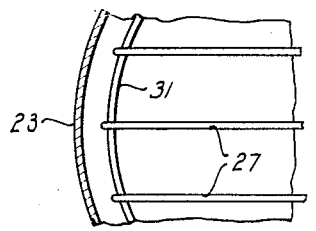
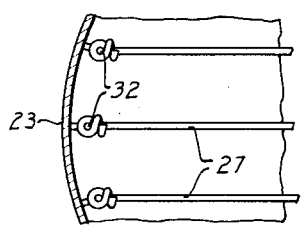
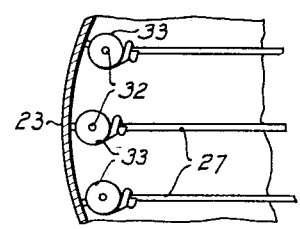
Fig. 8.  Fig. 10.  Fig. 12.
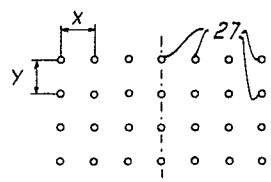
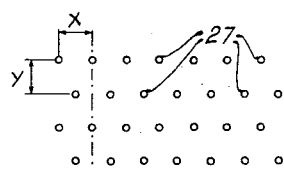
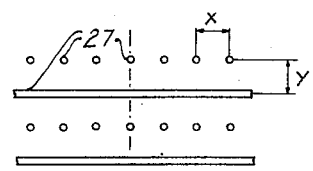
Fig. 13.  Fig. 14.  Fig. 15.
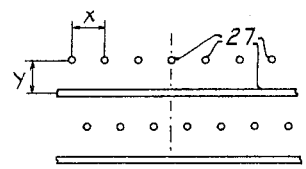
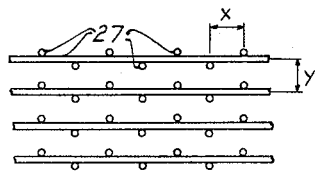
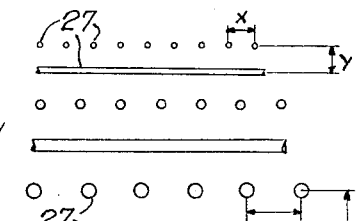
Fig. 16.  Fig. 17.  Fig. 18.
Inventors
François Hallopeau
Willi Boveri
Arthur Gaudenzi
By
Attorney Patented Feb. 13, 1934

1,947,412

UNITED STATES PATENT OFFICE 1,947,412

CONTROL GRID STRUCTURE FOR RECTIFIERS

François Hallopeau, Paris, France, Willi Boveri, Mannheim, Germany, and Arthur Gaudenzi, Baden, Switzerland, assignors to Aktiengesellschaft Brown Boveri & Cie., Baden, Switzerland, a joint-stock company of Switzerland Application April 26, 1930, Serial No. 447,744, and in Germany April 4, 1929

6 Claims. (Cl. 250—27.5)

This invention relates to improvements in electric current rectifier structures and, more particularly, to a control grid construction for arrangement adjacent the anodes of such rectifiers.

When an electric current rectifier is provided with grids arranged in each of the arc guides of a rectifier, it is possible to prevent backfiring to a very large extent, if not entirely, as well as to aid the ignition of the rectifier or transference of the arc from the ignition anodes to the main or operating anodes of the structure, particularly at low currents; and it is likewise possible to control the voltage, particularly at low currents, to avoid the well known voltage rise at no load or at very light load on the rectifier.

As is well known in the art, the danger of backfires in electric current rectifying devices of the metallic vapor type is one of the disadvantages of such rectifiers and in some cases may even lead to rejection of the rectifier as a means for converting alternating into direct current where the supply of direct current must be absolutely continuous and uniform. A backfire, that is, a flow of current from one main anode to another main anode in a rectifier, when of more than of momentary duration, may cause such disturbance of the alternating current supply system as well as of the direct current work system as to require a very considerable amount of time and material to place the installation in its original condition.

Backfiring in a rectifier usually occurs immediately after extinguishment of the arc flowing from an anode to the cathode because of concentration of the arc at points on the anode contaminated with foreign material. Such points become sufficiently heated to emit electrons thus forming a cathode spot on the anode which permits the arc to flow from the following anode to such spot rather than to the cathode.

The provision of grids upon which such potential may be impressed as will prevent re-ignition of an operating anode after the arc has moved to the following anode thus avoids one of the greatest disadvantages of the present type of metallic vapor electric current rectifier.

Grids arranged as described above may likewise be utilized to aid in ignition or transference of the arc from the ignition anode to the operating anodes of a rectifier, particularly at low current. Such transference of the arc is possible because the potential on the grid may be varied as desired to obtain any necessary degree of potential between the anode which is to pick up the arc and the cathode as well as permitting the supply of a potential adjacent the anode which has ceased operating and thereby prevent re-ignition of such anode or backfiring from the following anode.

It is well known that electric current rectifying structures of the metallic vapor type when operated at no-load or at low-load exhibit a rise of voltage in the direct current work circuit which is highly undesirable because of its deleterious effect on apparatus connected to the direct current work circuit. The use of grids arranged adjacent the anode permits the voltage in the rectifier to be controlled whereby the sudden sharp rise in voltage at no-load or at low-load may be practically eliminated. Such control of a rectifying structure is particularly desirable when the voltage in the direct current system supplied by the rectifier must be maintained at an approximately constant value.

The arc is prevented from attaching on an anode by making the grid negative so that it is surrounded by a positive space charge which blocks passage therethrough of the electrons. Such charge likewise increases the voltage necessary for starting an arc. To obtain positive control, the elements of the grid must extend over a certain distance along the axis of the arc, as herein described.

It is, therefore, among the objects of the present invention to provide a grid structure for incorporation in an electric current rectifying device utilizing metallic vapor as the carrying medium for an electric arc discharge between the anodes and the cathode of such device.

Another object of the present invention is to provide an electric current rectifier grid structure in which the grid will act not only in a purely mechanical manner but will have an electric valve action favorable to the operation of the rectifier.

Another object of the present invention is to provide a grid structure for rectifiers in which the grid openings are so proportioned and arranged that a complete ionic charging thereof is obtained thereby enabling the grid to operate both mechanically and electrically to obtain the conditions which are most favorable for the complete electric valve action in the rectifier.

Figure 3:
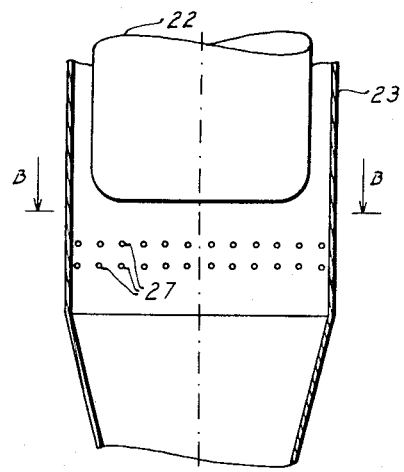
Figure 2:
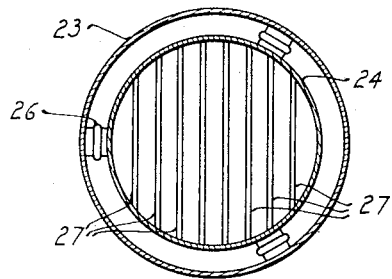
Figure 4:
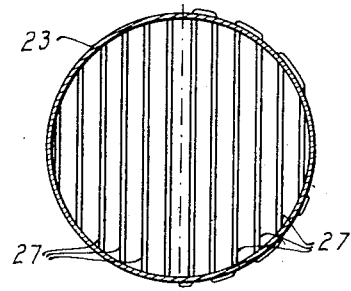

Objects and advantages, other than those above set forth, will be apparent from the following description and the annexed drawings in which Figure 1 is a partial vertical sectional view of an electric current rectifier anode enclosed in an arc guide with a grid embodying the present invention arranged therein in insulated relation thereto, Fig. 2 is a horizontal cross-sectional view taken on the line II—II of Fig. 1 showing the manner of spacing and of supporting the grid structure in the arc guide, Fig. 3 is a view similar to that shown in Fig. 1 showing a different type of grid structure, Fig. 4 is a view similar to that shown in Fig. 2, taken on the line IV—IV of Fig. 3, showing the arrangement and construction of the modified form of the grid.

Figure 5:
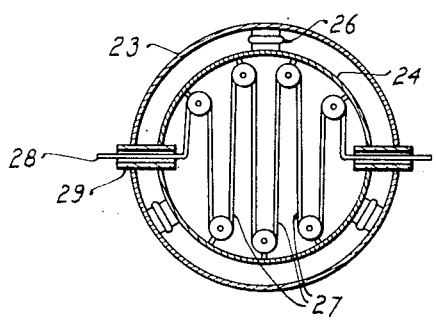
Figure 6:
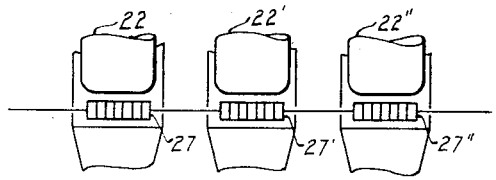

Fig. 5 is a bottom plan view of an embodiment of the invention in which the grid structure is arranged in insulated relation within the arc guide in a manner similar to that shown in Figs. 1 and 2 and is provided with conductors extending through the arc guide in insulated relation therewith for a purpose which will appear hereinafter, Fig. 6 is a schematic arrangement showing the grid structures of the several anodes of a rectifier connected in conductive relation, Fig. 7 is a fragmentary sectional view of one method of supporting the elements of the grid structure in the arc guide, Fig. 8 is a top plan view of Fig. 7, Fig. 9 is a fragmentary sectional view of an arc guide showing an alternate method of supporting the elements forming the grid structure, Fig. 10 is a top plan view of Fig. 9, Fig. 11 is a view similar to that shown in Fig. 9 with the exception that the grid elements are here supported in insulated relation within the arc guide, Fig. 12 is a top plan view of Fig. 11, Figs. 13 and 14 schematically illustrate different methods of spacing the elements of the grid when arranged with the longitudinal axis of the elements in parallel, Figs. 15 and 16 are schematic views showing the arrangement of the elements of the grid when alternate parallel planes of the grid elements are arranged with their longitudinal axes at right angles to each other, Fig. 17 is a schematic view showing the grid elements with their longitudinal axes arranged at right angles and, at least partially, in contact with each other, and Fig. 18 schematically shows the arrangement of the grid elements with their longitudinal axes in the different planes at right angles to each other and with the grid elements increasing, in cross-sectional size progressively from the series of elements most closely adjacent the anode to those farthest away from the anode.

Referring more particularly to the drawings by characters of reference, the reference numeral 22 indicates a portion of an anode arranged in the usual insulated relation with respect to the remainder of the rectifying structure (not shown) and 23 indicates a portion of an arc guide arranged, in the usual insulated relation, (not shown) about the anode 22 and extending downwardly therefrom. A ring or frame 24 is supported within the arc guide 23 by suitable insulators 26 which space the ring from the arc guide. A plurality of grid elements 27 in the form of rods or wires are arranged in spaced parallel relation, in parallel planes, with their longitudinal axes parallel and are secured to the frame either by welding or threading through holes in the ring as may be desired. The arrangement of the grid elements 27 in the embodiment shown in Fig. 3, is similar to that shown in Fig. 1, except that the ring 24 is omitted and the grid elements 27 are connected directly to the arc guide 23.

The grid structure above described with respect to Fig. 1 is modified as shown in Fig. 5 when it is desired to conductively connect the grids of all of the anodes in series in a closed circuit or when it becomes desirable, to connect the grids to a source of potential exteriorly of the rectifier for the purpose of using any one of the grid potential control systems now known in the art. The grid may also be used as a heating resistance by connection to an outside source of current. In this construction the grid elements 27 are necessarily formed as a continuous element, the ends 28 of which extend through insulators 29 arranged through the side walls of the arc guide.

The grids of the different anodes, being at different potentials, the difference of potential can be used as a source for circulating a heating current therethrough. The grids 27, 27', etc., of the several anodes 22, 22', etc., are then connected as shown in Fig. 6.

Instead of utilizing the ring 24 for the purpose of supporting the grid, a plurality of angle members 31 arranged one above the other, as shown in Fig. 7, may likewise be used. The rods or wires constituting the grid elements are then merely formed with bent or hook-like end portions and may be arranged to engage in notches or holes cut out of the angle iron members 31.

A plurality of hooks or hook-like supports 32 may likewise be secured, in any suitable manner, to the arc guides 23 to which hooks the grid elements 27 are secured by means of loops or eyes formed in the ends thereof and passing over the hooks. If it is considered desirable to arrange the grid elements in an insulated relation relative the hooks 32 fastened to the arc guides 23, insulators may first be mounted on the hooks 32 and the said elements 27 are then looped directly on the insulators 33.

The grid elements 27 are preferably arranged as above described in a plurality of uniformly spaced parallel planes and the elements of each plane are preferably spaced the same distance from each other that the planes are spaced from each other, that is the distance X equals the distance Y. As shown in Fig. 13, the elements of the several planes may be arranged perpendicularly above each other in planes parallel to the axis of the arc guide but are preferably arranged as shown in Fig. 14 in which the elements of the several planes are arranged, in their own plane, intermediately of the elements of the adjacent planes. The elements of the several planes may be so arranged that the longitudinal axes of the elements extend in the same direction but are preferably arranged to extend at right angles to the longitudinal axis of the adjacent plane as shown in Figs. 15 and 16 respectively.

A further modified form of the arrangement of elements of the several planes may be seen in Fig. 17 where the elements of three planes are shown in contact. Such contacting planes of elements may be replaced by an interlaced wire or rod mesh, if desired, providing the open areas of the mesh are properly dimensioned to secure complete space charging of the mesh.

A particularly advantageous arrangement of the planes of the grid is shown in Fig. 18 in which the wires of adjacent planes are so arranged that their longitudinal axes are at right angles to each other and in which the cross-sectional size of the elements of the several planes increases progressively from the plane closest the anode to the plane most remote therefrom. In the arrangement described immediately above, the smallest wires are preferably made of tungsten, molybdenum or other difficultly fusible metal while the wires spaced farther away from the anode may be made of iron or other suitable material not so difficult to fuse as the tungsten, etc. This arrangement has the particular advantage that the vapor density directly ahead of the anode is materially decreased due to the heat radiation of the wires of smaller cross section which quickly reach a high temperature.

It will be apparent that in view of the high temperatures encountered in rectifier operation, the grid elements must be made of some difficultly fusible material, such as tungsten, molybdenum or the like, and must be made of a metal which does not amalgamate with the cathode material which is usually mercury. The material of the grid elements must likewise be determined in dependence on the load at which the rectifier is operated. In operation, the grid elements are heated very quickly when the rectifier is started up and immediately radiate the intense heat acquired in all directions so that the heat radiated from the elements, being retained within the arc guides, immediately vaporizes any condensed cathode material thereon. The intense heat radiated within the arc guide immediately ahead of the anodes further aids to prevent backfires by decreasing the vapor density of the material ahead of the anodes so that the appearance of backfires is further materially decreased. The ionic charge carriers flowing to the anode are controlled by the charge on the grid which is due to the voltage drop across the grids when all of the grids of the anode are connected in a closed circuit or when a potential is applied from an exterior source. It will, of course, be understood that the grid element may be made of some material having a low ohmic resistance so that the current flowing through the grid may assist in reducing the quantity of mercury vapor ahead of the anodes and thereby avoid the use of an additional exterior heat source for the grids.

Although but a few embodiments of the present invention have been illustrated and described, it will be apparent to those skilled in the art that various changes and modifications may be made therein without departing from the spirit of the invention or from the scope of the appended claims.

The invention claimed is:

1. In an electric current rectifier, the combination of an anode, an arc guide arranged about said anode, and a control grid structure comprising a plurality of rod-like members divided into a plurality of groups supported within the said arc guide in different parallel planes extending transversely to the longitudinal axis of said guide, the respective members of each of said groups being arranged in spaced parallel relation and extending transversely to the members of the next adjacent groups.

2. In an electric current rectifier, the combination of an anode, an arc guide of electrically conductive material arranged about said anode, a control grid structure comprising a plurality of electrically conductive rod-like members divided into a plurality of groups arranged within said guide in different parallel planes extending transversely to the longitudinal axis of said guide, the respective members of each of said groups being arranged in spaced parallel relation and extending transversely to the members of the next adjacent groups, and means for supporting said members within the said guide in insulated relation therewith.

3. In an electric current rectifier, the combination of an anode, an arc guide of electrically conducted material arranged about said anode, a ring supported within said guide in insulated relation therewith, and a control grid structure comprising a plurality of rod-like members divided into a plurality of groups supported on said ring in a plurality of parallel planes extending transversely to the longitudinal axis of said guide, the respective members of each of said groups being arranged in spaced parallel relation and extending transversely to the members of the next adjacent group.

4. In an electric current rectifier, the combination of an anode, an arc guide arranged about said anode, a control grid structure comprising a plurality of members divided into a plurality of groups supported within said guide in different parallel planes extending transversely to the longitudinal axis of said guide, the respective members of each of said groups being arranged in spaced parallel relation, and the members of the respective groups extending transversely to the members of the next adjacent group.

5. In an electric current rectifier, the combination of an anode, an arc guide arranged about said anode, and a control grid structure comprising a plurality of rod-like members arranged in a plurality of groups supported within said guide in a plurality of parallel planes extending transversely to the longitudinal axis of said guide, the respective members of each of said groups being arranged in spaced parallel relation and extending transversely to the members of the next adjacent groups, and the spacing between the members of the respective groups being substantially equal to the spacing between the next adjacent groups.

6. In an electric current rectifier, the combination of an arc guide, an anode extending into said guide from one end thereof, a control grid structure comprising a plurality of rod like electrically conductive members divided into a plurality of groups extending across said guide in a plurality of parallel planes intermediate said anode and the end of said guide opposite to the said one end thereof, the members of the respective groups being arranged in spaced parallel relation, and the members forming the respective groups decreasing progressively in number and increasing progressively in diameter from the plane nearest to the anode to the plane nearest to the said opposite end of said guide.

FRANÇOIS HALLOPEAU.
WILLI BOVERI.
ARTHUR GAUDENZI.